(12) United States Patent
Kwon

(10) Patent No.: US 6,211,724 B1
(45) Date of Patent: Apr. 3, 2001

(54) DUPLEX BOARD SYSTEM WITH A GLITCH CANCELLATION CIRCUIT

(75) Inventor: Hwan-Woo Kwon, Incheon (KR)

(73) Assignee: Daewoo Telecom, Ltd., Incheon (KR)

( * ) Notice: Subject to any disclaimer, the term of this patent is extended or adjusted under 35 U.S.C. 154(b) by 0 days.

(21) Appl. No.: 09/055,251

(22) Filed: Apr. 6, 1998

(30) Foreign Application Priority Data

May 27, 1997 (KR) .................................................. 97-20811

(51) Int. Cl.$^7$ ........................................................ G06F 11/16

(52) U.S. Cl. ............................................ 327/526; 327/551

(58) Field of Search .................................. 327/564–566, 327/379, 551, 526; 361/764, 784, 803; 370/217, 376

(56) References Cited

U.S. PATENT DOCUMENTS 4,635,249 * 1/1987 Bortolini et al. ....................... 370/58

\* cited by examiner

Primary Examiner—Kenneth B. Wells
(74) Attorney, Agent, or Firm—Bacon & Thomas, PLLC

(57) ABSTRACT

A duplex board system comprises two functionally identical processing boards, one of the boards being in an active state and the other being in a stand-by state, each of the boards generating a state signal depicting the state thereof, wherein the stand-by state board succeeds the active state board when the state of the active state board becomes deactivated; and two cancelling units, each coupled between the two boards for receiving the state signal from one of the boards, suppressing a glitch period from the state signal generated at said one of the boards, the glitch period representing an unstable signal level transition of the state signal, and outputting the glitch suppressed state signal to the other board.

4 Claims, 2 Drawing Sheets

DUPLEX BOARD SYSTEM WITH A GLITCH CANCELLATION CIRCUIT

FIELD OF THE INVENTION

The present invention relates to an electronic switching system; and, more particularly, to a duplex board system with a glitch cancellation circuit.

BACKGROUND OF THE INVENTION

In an electronic switching system, for instance, two main boards for call processing are dualized to construct a duplex board system for system reliability. The duplex board system includes two boards which are functionally identical each other, one of the boards, which is in an active state, performing the function thereof while the other is in a standby state. The stand-by-state board takes over the function of the active state board when the active board fails to function properly due to a defect developed therein.

Referring to FIG. 1, there is provided a conventional duplex board system 10 which comprises two identical processing boards, a side_A board 1 and a side_B board 2.

A state signal ACT*_A through a line L1 depicts the state of the side_A board 1, wherein * denotes that a logic low state depicts the active state. And the state signal ACT*_B through the line L2 depicts the state of the side_B board 2.

It is assumed that the side_B board 2 currently performs the call processing in the active state, i.e., the ACT*_B presents a logic low, and the side_A board 1 has been installed now. When power is applied to the side_A board 1 from a power supply (not shown), the state of the side_A board 1 becomes at first stand-by, i.e., the ACT*_A shows a logic high.

If a defect is developed within the side_B board 2, the ACT*_B becomes logic high to represent the stand-by state. When the side_A board 1 receives the state signal ACT*_B of the stand-by, the side_A board 2 shifts to the active state, i.e., the ACT*_A becomes logic low. Therefore, the side_B board 2 can be removed from the whole system to repair the fault therein, without interrupting the call processing since the counterpart side_A board 1 takes over the call processing. The side_B board 2 is installed after being repaired and waits in the stand-by state as did the side_A board 1 before.

However, when one of the boards, e.g., the side_A board 1, is removed or installed, the state signal ACT*_A may have a glitch period which makes an undesirable state transition at the counterpart board. Accordingly, it is desirable to minimize or prevent the glitch period of the state signal between the boards of the duplex board system.

SUMMARY OF THE INVENTION

It is, therefore, a primary object of the present invention to provide a duplex board system for preventing an undesirable state transition generated by a glitch period of state signals between two boards of the duplex board system.

In accordance with the present invention, there is provided a duplex board system comprising:

two functionally identical processing boards, one of the boards being in an active state and the other being in a stand-by state, each of the boards generating a state signal depicting the state thereof, wherein the stand-by state board succeeds the active state board when the active state board becomes deactivated; and two cancelling units, each coupled between the two boards for receiving the state signal from one of the boards, suppressing a glitch period from the state signal generated at said one of the boards, the glitch period representing an unstable signal level transition of the state signal, and outputting the glitch suppressed state signal to the other board.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
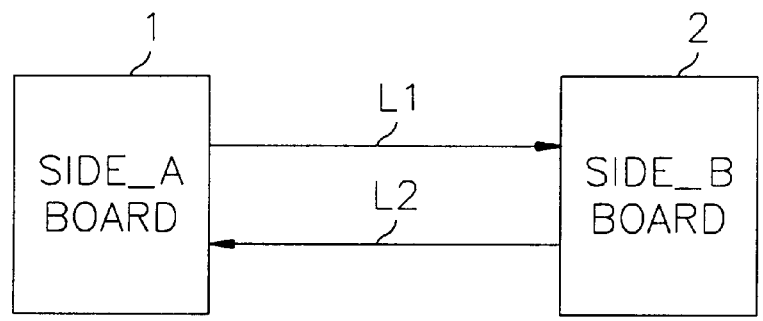
FIG. 1 presents a block diagram of a conventional duplex board system.
Figure 2:
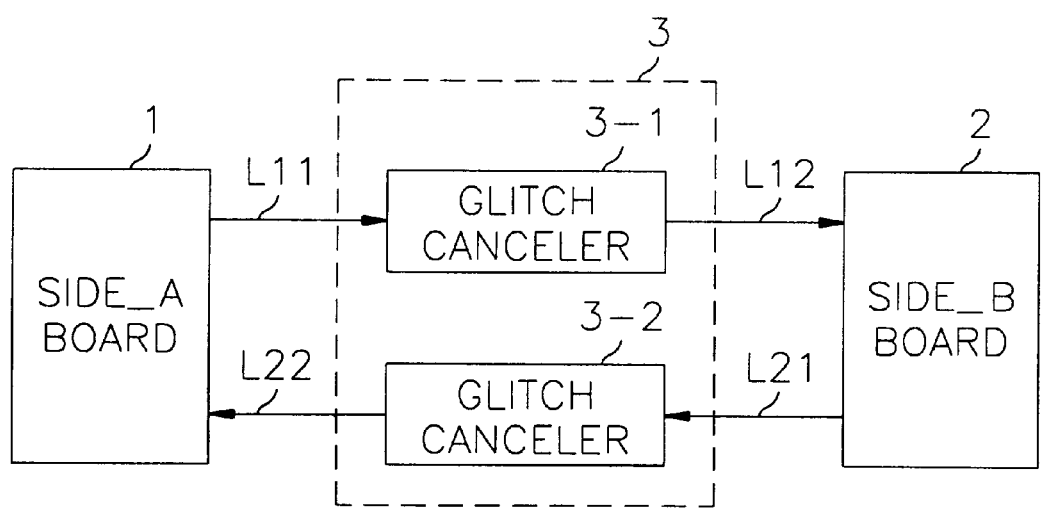
FIG. 2 provides a block diagram of a duplex board system with a glitch cancellation circuit in accordance with the present invention.

Referring to FIG. 2, there is provided a block diagram of an inventive duplex board system 20 which comprises a side_A board 1, a side_B board 2 and a glitch cancellation circuit 3.

The side_A board 1 and the side_B board 2 are functionally identical to each other. The side_B board 2 succeeds the side_A board 1 when the side_A board 1 is out of order, or vice versa.

For example, the side_A board 1 performs a call processing while the state thereof is the active state. if a defect is developed within the side_A board 1 during the call processing, the side_A board 1 is not capable of performing functions properly and is extracted from the system so that the defect be repaired. And the side_A board 1 is reinstalled at the system after the fault is repaired.

If the side_A board 1 is currently in an active state and the side_B board 2 is currently in a stand-by state, an input state signal INACT*_A, e.g., a logic low active signal, from the side_A board 1 through a line L11 depicts a logic low level and an input state signal INACT*_B from the side_B board 2 through a line L21 depicts a logic high level.

The glitch cancellation circuit 3 is located between the side_A board 1 and the side_B board 2 and includes two glitch cancelers 3-1 and 3-2. The glitch canceler 3-1 suppresses a glitch from the input state signal INACT*_A received from the side_A board 1 to output an output state signal OUTACT*_A to the side_B board 2 through a line L12. And the glitch canceler 3-2 suppresses the glitch from the input state signal INACT*_B received from the side_B board 2 to output an output state signal OUTACT*_B to the side_A board 1 through a line L22.

Figure 3:
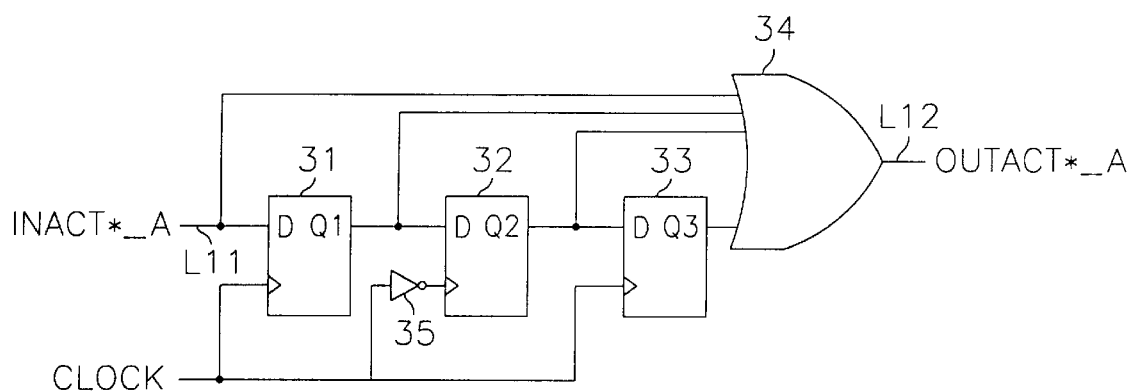
FIG. 3 offers an exemplary circuit diagram of the glitch cancellation circuit in FIG. 2.

Referring to FIG. 3, there is provided an exemplary circuit diagram of the glitch canceler 3-1 which contains three D-flipflops 31 to 33, an OR gate 34 and an inverter 35.

The input state signal INACT*_A is inputted to the first D-flipflop 31 and the OR gate 34 through the line L11. The output Q1 of the first D-flipflop 31 is inputted to the second D-flipflop 32 and the OR gate 34. The output Q2 of the second D-flipflop 32 is inputted to the third D-flipflop 33 and the OR gate 34. The output Q3 of the third D-flipflop 33 is inputted to the OR gate 34. The output of the OR gate 34 is inputted to the side_B board 2 through the line L12.

A clock signal, e.g., a 50% duty cycle rectangular pulse, is applied from a clock signal source (not shown) to the first and third D-flipflop 31 and 33 and an inverted clock signal via the inverter 35 is applied to the D-flipflop 32.

The output Q1 of the first D-flipflop 31 is a state signal synchronized with the clock signal. And the output Q2 of the second D-flipflop 32 is a delayed Q1 which is delayed by as much as a half period of the clock signal. And the output Q3 of the third D-flipflop 33 is a delayed Q2 which is delayed by as much as a half period of the clock signal. The state signal and the outputs Q1 to Q3 are logically added at the OR gate 34. The OR gate 34 outputs an output state signal OCTACT*_A.

Figure 4:
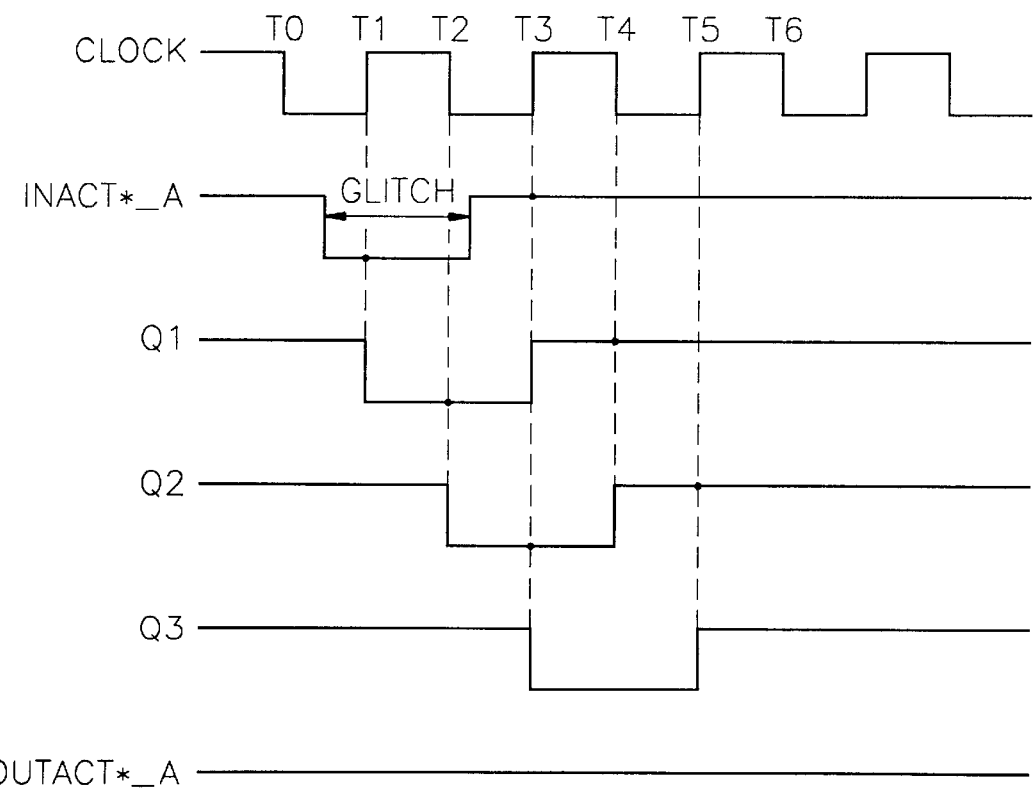
FIG. 4 illustrates a timing diagram for describing the operation of the glitch cancellation circuit in FIG. 3.

Referring to FIG. 4, there is a timing diagram illustrating the operation of the glitch cancellation circuit in FIG. 3.

As shown in FIG. 4, the clock signal is the 50% duty cycle rectangular pulse.

The input state signal INACT*_A having the glitch, whose duration is longer than a half period of the clock signal, as shown in FIG. 4 is inputted to the first D-flipflop 31.

Since the clock signal is inputted to the first D-flipflop 31, the output Q1 becomes the logic low level between T1 and T3.

And, the output Q2 becomes the logic low level between T2 and T4 since the inverted clock signal is inputted to the second D-flipflop 32. In other words, the output Q2 is the delayed Q1 by as much as a half period of the clock signal.

Further, the output Q3 becomes the logic low level between T3 and T5, that is, the output Q2 is the delayed Q2 by as much as a half period of the clock signal.

At the OR gate 34, the INACT*_A and the Q1 to Q3 are logically added to generate the OUTACT*_A having no glitch as shown in FIG. 4.

Consequently, by using the glitch canceler 3-1, the glitch suppressed state signal is provided to the side_B board 2 whereby the undesirable state transition can be avoided.

While the present invention has been shown and described with respect to the particular embodiments, it will be apparent to those skilled in the art that many changes and modifications may be made without departing from the spirit and scope of the invention as defined in the appended claims.

What is claimed is:

1. A duplex board system comprising:

two functionally identical processing boards, one of the boards being in an active state and the other being in a stand-by state, each of the boards generating a state signal depicting the state thereof, wherein the stand-by state board succeeds the active state board when the active state board becomes deactivated; and two cancelling means, each coupled between the two boards for receiving the state signal from one of the boards, suppressing a glitch period from the state signal generated at said one of the boards, the glitch period representing an unstable signal level transition of the state signal, and outputting the glitch suppressed state signal to the other board.

2. The duplex board system of claim 1, wherein each of the cancelling means includes:

means for delaying the state signal from said one of the boards to output a plurality of delayed state signals; and means for combining logically the state signal and the plurality of delayed state signals to suppress the glitch period below a predetermined duration.

3. The duplex board system of claim 2, wherein the delaying means includes a plurality of D-flipflops.

4. The duplex board system of claim 2, wherein the combining means includes an OR gate.

* * * * *